April 28, 1936.  L. H. BROWNE  2,038,985
AUTOMOBILE REVERSE MOVEMENT CONTROL
Filed Dec. 23, 1932
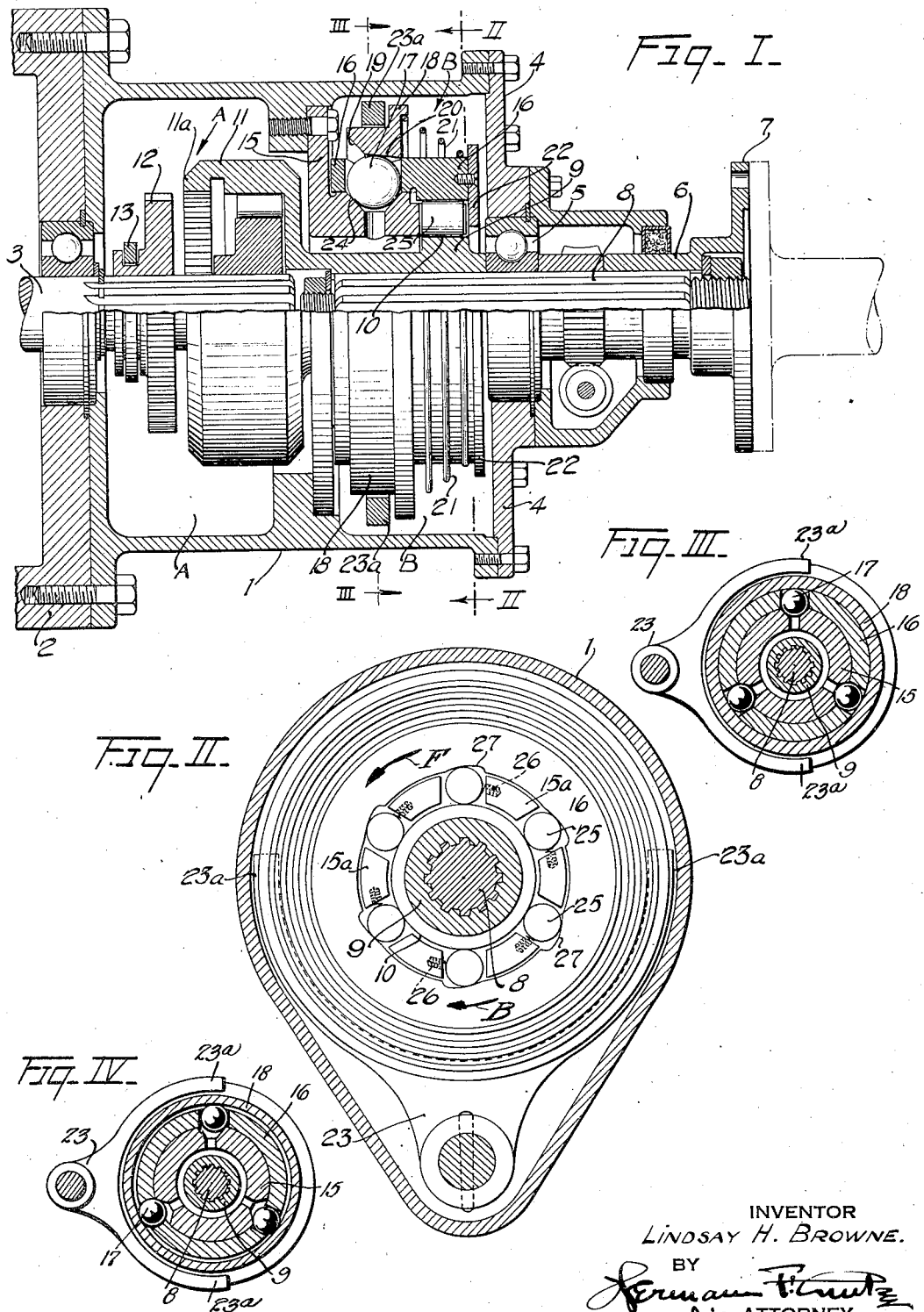
INVENTOR
LINDSAY H. BROWNE.
BY
his ATTORNEY Patented Apr. 28, 1936

2,038,985

UNITED STATES PATENT OFFICE 2,038,985

AUTOMOBILE REVERSE MOVEMENT CONTROL

Lindsay Hugh Browne, Rochester, N. Y., assignor to Josiah Anstice & Co., Inc., Rochester, N. Y., a corporation of New York Application December 23, 1932, Serial No. 648,533

8 Claims. (Cl. 188—30)

This invention relates to the control of an automobile, motor car or the like power transmission, as well as the movement of such vehicles when no power is applied. When no power is applied two conditions exist, namely, a vehicle is liable to roll backward on an incline, and that condition is met in the practice of this invention by locking the car against back-rolling. In the other case broadly forward-rolling on a decline may be entirely due to the mass of the car and at the volition of the driver, without the operation of the engine and therefore conserving the fuel.

This invention in particular relates to mechanism for preventing back-rolling, but in conjunction therewith the free-wheeling forward-rolling may be combined, as shown in the accompanying drawing, and as more particularly set forth in conjunction with the driver's control means, fully described in my copending application Serial No. 569,159 filed October 16, 1931.

This application relates more particularly to the construction of the mechanism to prevent back-rolling, in which I provide the required back-rolling lock, but also provide the means to offset its effect, or prevent it from being effected, by a structure under control of the operator of the car, but in particular having such mechanism so constructed and arranged that it provides for most economical assembly of the parts and the mounting of the parts, as well as their construction, and thereafter the inspection or adjustment in order that all practical requirements of present day motor car construction may be met, both in manufacture of parts, assembly, operation, the inspection and servicing of the devices. In particular the invention herein set forth relates to the back-locking mechanism, and as desired its combination with free-wheeling mechanism associated with the transmission of an automobile. Also the objects of my invention are to provide back-locking mechanism having means to positively prevent the functioning of the back-locking, and means to instantly and positively release such control mechanism, and to set it subject to automatically forcing it or moving it instantly into an effective position to cause the back-locking function when desired, and to automatically control its operation generally in a fool-proof manner. The embodiment of my invention permits the balancing of forces, so that the function of locking against back rolling is assured with an inherent reaction strain overbalanced by a preponderant force of other parts set by a predetermined pressure, not subject to the judgment of the driver, but inherent in the design and structural coordination of parts to automatically assure safety and proper functioning. In order to release the back roll stop under any strain, the preponderant over-balancing force is released and instantly establishes a preponderant over-balance of the force due to the strain of back rolling, assuring instant release from functioning. With this it provides for the automatic or controlled means associated with the devices to cause functioning, in a manner permitting the devices or parts to remain stationary as distinguished from my prior applications for Letters Patent, in which parts having similar functions are constantly rotating when the vehicle is in operation. It also provides for the assembly of such parts with greater convenience, and therefore simplicity of production and embodiment in construction whether it be a supplemental part to the transmission, or whether it be embodied as an integrally originally designed assembly with the transmission mechanism of the automobile.

One embodiment of my invention is shown in the accompanying drawing, in which:

Fig. I is a horizontal section of a housing through the axis of the power shafts with a half section of the back-rolling and free-wheel mechanism, while the other half is shown in plan.

Fig. II is a vertical section on the line II—II of Fig. I.

Fig. III is a cross-section on line III—III of Fig. I, on a smaller scale, with the setting elements in position for back roll lock functioning.

Fig. IV is a cross-section similar to Fig. III, with the setting mechanism in out-of-functioning position.

A housing 1 is shown for the purpose of illustration and may be of any suitable form, attached rigidly to the casing 2 which serves to indicate the rear end of the ordinary transmission casing. The driving shaft 3 extends from the transmission casing into the supplemental casing 1 containing the free-wheeling couple A and the back-rolling lock couple B. The housing 1 has the cover or head 4 rigidly bolted thereto and readily removable, which provides a bearing 5 for the driven shaft 6 which drives through a flange coupling 7, but may be in any suitable or usual manner connected through universal joint and propeller shaft extension through the rear axle or jack-shaft of an automobile, but which essentially is in direct connection at all times with the driving wheels of the car.

In the form shown, the driven shaft assembly comprises the spline member 8 which carries the interlocking broached member 6, the cone member of the bearing 5, and the interlocked broached member 9, which at one end has the cylindrical face 10 on a hub portion forming the back-rolling locking face. The extension of the shaft or sleeve 9 forms at 11 the outer bearing for the free-wheeling roller clutch, and at its end 11a has suitable internal gears or clutch teeth adapted to engage the shifting member 12 of the free-wheeling couple which is moved into or out of engagement by the fork 13. The parts of the free-wheeling couple are of a usual design, and its actuation or control may be any form such, for example, as set forth in my copending application, but the interrelation of the driving member 11 with the back-rolling lock mechanism provides a novel relation of particular advantage with respect to manufacture and assembly, as hereinafter described.

The back-rolling lock couple has the stationary member 15 suitably bolted to the interior of the housing 1 and constitutes the cam-carrier, namely, by supporting the annular cam member 16 mounted thereon capable of slight rotary movement subject to the control of the interengaging locking balls 17, of which one is shown, but in my preferred form 3 are disposed equidistant around the cam 16 with each ball fitting closely in a radial hole in the cam and adapted to be forced inwardly for locking purposes, or outwardly to release the cam member from the cam-carrier 15.

A floating ring 18 mounted on the cam member 16 has a bearing face 19 at an obtuse angle, such as approximating forty-five degrees and serves to engage the balls 17 exerting only slight radial pressure on the balls, but serving essentially to position the floating ring with respect to the locking balls. Another portion of the interior of the floating ring, namely, the bearing face 20 is at a slight angle to the axis of movement of the floating ring, which is the same as the axis of the couple, and this bearing face approximating in the form shown, five degrees provides a reaction on the balls when pressed over the balls that forces the balls radially inward into their locking position, with a predetermined resistance to assure the desired locking of the cam member 16 with the cam-carrier 15. The force on the floating ring 18 tending to drive it into locking position, is caused by the spring 21 mounted between the floating ring and an abutment, such as the annular flange 22 rigidly secured on the end of the cam member 16. A fork 23 with fork-arms 23a engages the floating member on one side to force the floating ring 18 against the pressure of the spring 21, but the opposite movement of the fork does not move the floating ring, but leaves it free so that the floating ring can be moved only by the spring 21, and such movement is subject to the reaction of the various other parts of the back-rolling lock mechanism, as hereinafter described.

The cam-carrier 15 has countersunk holes 24 radially abutting the cylindrical holes which carry the balls 17 in the cam member 16. These counterbores or tapered holes have walls which are inclined at an angle to meet the required conditions, and in structures designed for a standard type of car serve their purpose of the desired inter-balance of reactions when made at an angle of approximately thirty degrees to the axis of the holes. The angle of the walls of the holes is made to provide a reaction against the balls that will drive them radially outward when the pressure of the floating ring is relieved by its being moved against the pressure of its setting spring 21, and such radial outward moving of balls 17 occurs due to reaction of the back-rolling lock rollers 25 turning the cam member 16 with respect to the cam-carrier 15 by counter-clockwise movement of the cylindrical locking face 10.

The cam-carrier 15 has rigidly associated projections 15a forming abutments, and between these abutments rollers 25 are free to move a predetermined distance, but subject to springs 26 pressing them in one direction. The movement of the rollers is dependent upon the position of the cam member 16 having the cam faces 27, one each opposite one of the rollers, and which cam faces 27 are preferably slightly curved in order that the angle of engagement of each roller with its cam face will be substantially uniform in the different relative positions of the cam-carrier 15 with respect to the abutments 15a. Thus, when the cam member 16 is slightly rotated counter-clockwise as indicated by arrow F in Fig. II, as in practice to the extent of approximately five degrees but depending upon the particular design, permitted by release of pressure on balls 17, some balls dropping by their weight, but all balls being forced radially outward by reaction of the bevel face 24, such movement with respect to the abutments 15a permit the rollers 25 to move under the pressure of springs 26 until they engage the adjacent end of the neighboring abutment, and such relation of cam face and abutments and therefore the rollers preclude the locking of the hub face 10 on the hub or shaft member 9, and consequently allows free rotation of the hub 9 and all its connected and associated driven shaft members. But when the cam member 16 has moved in a clockwise direction as shown by arrow B, Fig. II, it moves the rollers to compress the springs 26, then the cam faces 27 are in such a position that the rollers 25 will assume a locking position between the cam faces, and thereby the cam member 16 and the shaft or hub member 9,— thus preventing the car from starting to roll backward. In order that the cam member 16 be moved rotarily on the cam-carrier 15 into such locking position automatically at the proper time, the floating ring 18 with its bearing faces 19 and 20 engaging the balls 17 forces the balls radially inward against the beveled side of counterbore 24 and thus forces the cam member 16 into the position where the balls and their carrier holes register with the counterbore holes 24 in the cam-carrier, and the floating ring 18 by its riding face or bearing 20 with a slight angle forces the balls into such locking position under the influence of the predetermined tension of spring 21. To release the balls, a voluntary action is instantly effective through the fork action on the floating ring 18, and when so releasing the pressure on the balls the resistance to the reaction on the balls of the bevel face of the holes or counterbores 24 is such that it frees the cam member 16 to slightly rotate counter-clockwise on its bearing on the cam-carrier 15 and with respect to abutments 15a, which in turn permits the rollers 25 to move until they have engaged the adjacent abutment and are there stopped in a position where locking-action cannot occur between these rollers and the hub face 10 and the cam faces 27.

When the rollers 25 engage the adjacent abutment, the relation of cam 27 is such that the roller resists the rotary movement of the cam-carrier 16 against any reaction due to the pressure on balls 17 by the floating ring 18 because the steep bearing face 19 is then riding on the balls which have been forced to their radially outward position where the reaction due to spring 21 is insufficient to force the balls inward, but the balls are so held by the holes in the cam member pressing them out of register with the countersunk holes 24 and against the edge of the counterbore in the cam member 15, and so held by rollers 25 pressing against abutments 15a and temporarily holding cam 16 in the unlocked position, which is in effect a locked-out position, with a force greatly preponderating any counter-force due to bearing 19 on the floating ring,— and such resistance continues, and thereby keeps the back-rolling lock couple out of functioning, until a forward rotation of the hub 9 starts to roll the rollers 25 away from the abutments 15a against the pressure of springs 26. With the rollers 25 against the abutments 15a the cam member is locked out and cannot resume a functioning position until released by a definite movement of the rollers. This release occurs when the driven shaft 10 turning in the direction of relative forward motion or forward rolling of the car, and then the first slight rotary movement, predetermined by each particular design, of cam member 16 shifts balls 17 sufficiently toward registration with counterbores 24, and off the edge of the countersink, so that pressure of the floating ring greatly preponderates and instantly forces the balls radially inward, and then the over-riding bearing 20 with its small angle rigidly forces and locks the cam member in its position to effect back roll locking. Such forward turning movement of the hub 9 with its driving shaft connections can only occur with the forward movement of the vehicle, or when the power of the engine is exerted on the driving shaft to turn the driven shaft forward.

Thus cam member 16 is automatically shifted into functioning position by the floating ring pressure on balls 17 seating in the counterbores 24,—when the counter-action of the balls has been relieved by the first slight turning movement of member 16 due to forward turning of the cylindrical locking part 10, which starts to roll rollers 25 away from their abutments and against springs 26. As all parts are well oiled such movement is uniformly assured. Cam member 16 moves out-of-functioning position when the ring pressure on balls 17 is released, because then the back roll locking strain on rollers 25 forces cam member 16 in the direction of the locking force until the rollers engage the abutments 15a, and that slight turning of cam member 16 forces balls 17 outward by driving them against the bevel face or walls of the counterbore 24, at a time when the floating ring offers no effective resistance to such release. Thus, the holding-out of action or functioning of the back-locking mechanism is assured after the voluntary release of the couple by movement of fork 23, and maintains it out of functioning until the vehicle is driven or rolls forward. This automatic action is permitted when the fork 23 has been moved against the spring 21 to relieve the floating ring of any pressure on the balls, so that in the changing of gears the driver may shift them into neutral or in forward position, but it will not cause any functioning of the back-rolling mechanism so long as the vehicle is rolling backward or is stationary, but so soon as the operator allows the driving clutch to engage so that actual turning movement is transmitted for any forward drive, then the slight rotary action of cam-member 16 with relation to abutments 15a takes place and closer registration of the balls 17 with the counterbores 24 permits the floating ring 18 to drive the balls into the position which locks the cam-member 16, and thereby the cam faces 27 in their functioning position to prevent back-rolling.

In Fig. III it will be seen that the release of the cam-ring 16 with respect to the cam-carrier 15 is locked by the balls 17 held radially inward by the floating-ring 18, while in Fig. IV the section, similar to Fig. III, shows the condition when the floating-ring 18 is laterally displaced releasing the balls 17 radially outward, and thereby permits the cam-ring 16 to rotarily shift differentially on the cam-carrier 15 that slight extent circumferentially, which permits the locking rollers 25 to shift to engagement with the abutments 15a, shown in Fig. II, and thus prevents the rollers from reaching a locking contact between the cylindrical surface 10 on the shaft 9 and the cam surfaces on the cam-ring 16. In both of Figs. III and IV the casing surrounding the back roll lock mechanism is omitted.

It will be understood that the particular construction herein shown and described has its dimensions, angles of interengaging parts and spring pressure, all coordinated suitable for a particular type of vehicle subject to certain loads and torque strains, both for transmission and for reaction of the mass of the vehicle to meet the conditions of normal use on inclined roadbeds or driveways. Thus, the design herein set forth would meet the practical requirements for a vehicle weighing about two tons, while with a truck subject to a much greater live load, variations in the proportion of parts may be made to suit those conditions.

While the back-rolling lock mechanism, or such a couple combined with free-wheeling couple, may be added to a standard gear transmission box or casing, for new construction they or either of them may be designed as an original embodiment within the gear casing, and thereby closely associated with the other transmission gearing, and thereby protected and oiled alike with the other parts. As shown all of the members constituting the back-rolling lock couple may be assembled by mounting them in the open end of the casing 1, and any adjustments or inspection made when the cover or housing cap 4 is removed. Such arrangement also permits the supplemental housing containing the gear drive for speedometer connection, as shown.

For assembly the completed parts are introduced into the casing 1 by sliding the broached hub members of the free-wheeling part over the end of the spline drive shaft 3, thereafter the shaft 8 is inserted with the driven member 9 constituting part of the driven shaft connections and having the free-wheeling member 11. The back-rolling lock cam-carrier 15 is then inserted and lagged rigidly to the interior of the housing 1, after which the cam member 16 is inserted with balls 17, and the fork and floating ring are then put in position, and after the rollers 25 are inserted the ring flange 22 is secured in place with the spring 21. After this the bearings 5 with the cover 4 are positioned and locked in place.

In this manner the structure is most readily assembled and is subject to any needed inspection or adjustment, and in particular the cam members and the cam-locking balls and the floating ring are all mounted on the stationary cam-carrier 15. This in particular provides for holding all of the essential parts for both voluntary and for the automatic control of the functioning of the back-locking couple in a non-rotating manner, except for the slight relative shifting movement of the cam member 16 when setting the couple, or the slight lateral movement of the floating ring actuating and locking the setting mechanism. Nothing but the cylindrical bearing surface of the back-rolling lock couple rotates, and when the couple is not functioning it slides against the rollers without any bearing strain, and therefore provides no resistance of moving parts. Coupled with this is the advantage of having the stationary member offering the resistance against back-rolling carry all of the parts that are necessarily movable to effect the functioning, so that they are not subject to drag by rotation of parts in ordinary driving, and are not subject to wear or to accidental jamming, nor other effects that might otherwise be less advantageously met by having such parts constantly rotating. While variations may be made as hereinbefore set forth, and other changes may be made in arrangement, dimensions or relation of parts without departing from my invention, what I claim and desire to secure by Letters Patent is:

1. A back-rolling stop for power driven vehicles, having a driven shaft to rotate and be rotatable with the driven wheels, a member rigidly associated to rotate with a part of said shaft and having a circular bearing surface, rolling members engaging said bearing surface and a radially outward disposed cam ring, locking cams on one face of said ring adapted to lock said rolling members to prevent rotation of the driven shaft in one direction, means to release said cam ring to move under the locking pressure to a position to prevent the locking of the rolling members, and conversely to lock the cam ring in functioning position, a stationary anchoring member supporting said means and said cam ring and including parts for automatically returning the releasing means into functioning position.

2. A back-rolling lock mechanism for an automobile having a power shaft, a member fixed to turn therewith having a cylindrical bearing surface, a plurality of rollers adapted to engage said bearing surface, and a radially outward disposed cooperating cam ring, a stationary cam carrier for said cam ring having inter-engaging locking devices therefor and means for voluntary release of the locking devices and means for automatically shifting said locking devices into locking position.

3. A back-rolling lock mechanism for automobiles or the like including a driven shaft having an associated member with a cylindrical bearing surface on a part thereof, a plurality of rollers adapted to engage the surface of said member, separators for said rollers limiting their rotary movement about the cylindrical surface, a stationary member supporting said separators, a ring member carried on said stationary member having internal cam faces juxtaposed to the rollers and means for locking said ring member to the stationary member in a position causing a locking-engagement with the cylindrical member on the driven shaft, when the rotation of the driven shaft in the direction of forward movement of the vehicle automatically moves said ring member on the stationary member into such locking position.

4. A back-rolling lock mechanism of the character described, having a cam member with a plurality of back-rolling cams adapted when in one rotary position to prevent back-rolling, and in another rotary position to permit free back-rolling, back-locking rollers engaging the same, a stationary member forming the back-rolling anchorage-resistance, bearings on said stationary member for the cam members and abutments on the stationary member extending between the back-locking rollers, said stationary member providing means of support for the cam member to permit it to shift rotarily on the stationary member and a part automatically actuated to lock the cam member in one position thereon and operable in the reverse position to free the cam member and permit slight rotation thereof on the stationary member and with respect to said abutments, and means responsive to voluntary action for positively at all times forcing the release of said cam positioning means.

5. A back-rolling lock for an automobile or the like, having a series of rollers and an interior smooth cylindrical bearing surface and an exterior roller-engaging cam member, a stationary back-rolling anchorage member supporting said cam member with freedom of slight rotary movement thereon, abutments rigidly associated with the stationary member extending between the locking rollers and means for voluntarily freeing the cam member from the stationary member, whereby locking of the rollers is prevented by their cooperation with the abutments, and means for automatically actuating the means for holding said cam member to rigidly lock the same to the stationary member.

6. A back-rolling lock mechanism for power driven vehicles having locking rollers, a cam ring, a cooperating member having a cylindrical contact surface for locking engagement with said rollers and said cam ring, a setting means to shift the cam ring into locking position and to release it to permit movement to out-of-locking position, a stationary member to support said setting means having abutments adapted to engage the locking rollers to hold them out-of-locking position, and an actuating part supported to automatically cause said setting means to throw the lock into functioning position, and having means to throw the setting mechanism out-of-functioning position voluntarily at all times, connections whereby the setting members are free to move on said stationary member and are prevented from movement into locking position subject to release by the forward movement of the power driven vehicle.

7. A back-rolling lock as set forth in claim 6, having all of the locking and setting mechanism stationary subject only to slight shifting when setting the lock in functioning or out-of-functioning position.

8. A back roll stop for a motor car, a driven shaft member, coordinated parts encircling such shaft by assembling over one end of said shaft member successively an anchoring or stationary member, a back roll stop ring on said stationary member, balls for locking engagement of said ring on said stationary member, a floating ring to coact with said balls, rollers to engage said cam ring and the shaft member, a spring to press against said floating ring, and an abutment for said spring.

LINDSAY HUGH BROWNE.